Figure 5:
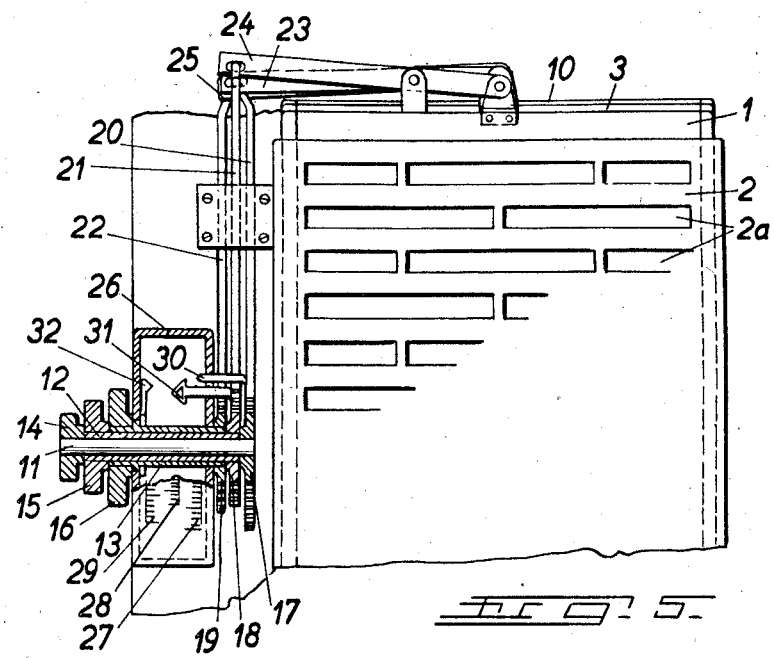

Nov. 24, 1942.                    F. BUSSE                        2,303,196
           APPARATUS FOR COMPENSATING FOR INCORRECT REPRODUCTION OF COLOR
                         Filed Sept. 26, 1940        2 Sheets-Sheet 1
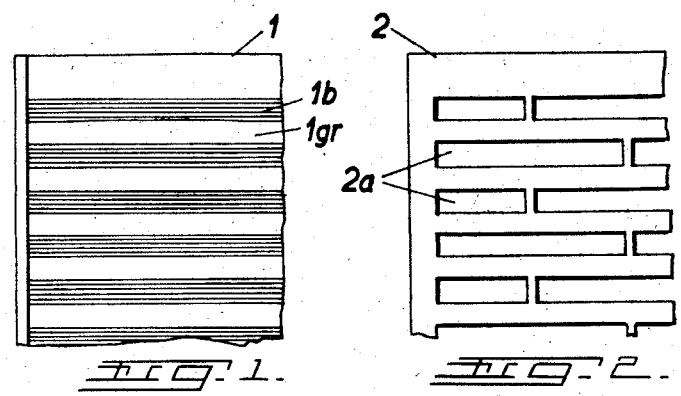
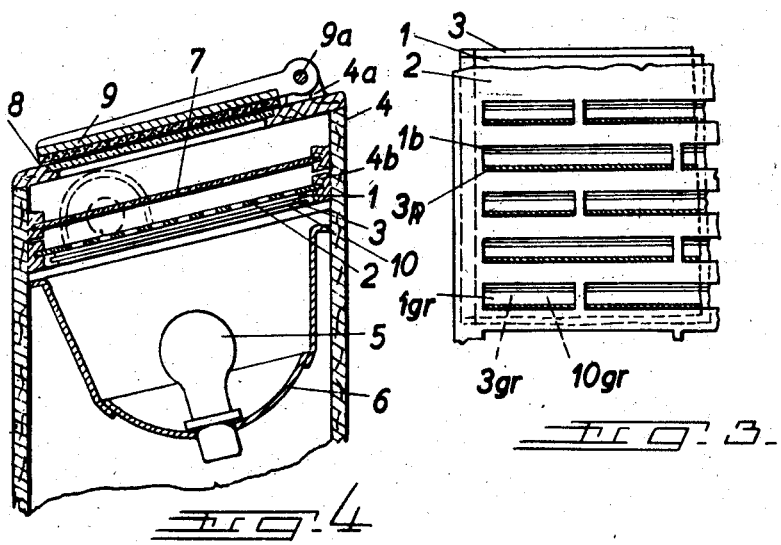
Inventor
FERDINAND BUSSE
BY
ATTORNEYS.

Nov. 24, 1942.   F. BUSSE   2,303,196
APPARATUS FOR COMPENSATING FOR INCORRECT REPRODUCTION OF COLOR
Filed Sept. 26, 1940   2 Sheets-Sheet 2

Inventor
FERDINAND BUSSE
BY
ATTORNEYS.

Patented Nov. 24, 1942

2,303,196

UNITED STATES PATENT OFFICE 2,303,196

APPARATUS FOR COMPENSATING FOR INCORRECT REPRODUCTION OF COLOR

Ferdinand Busse, Munich, Germany, assignor to General Aniline & Film Corporation, New York, N. Y., a corporation of Delaware Application September 26, 1940, Serial No. 358,527
In Germany September 11, 1939

10 Claims. (Cl. 95—73)

This invention is an improvement on the invention disclosed and claimed in my United States Patent No. 2,213,382, and relates to an apparatus for compensating for incorrect reproduction of color in color photography when copying or enlarging.

The light filters inserted in the path of the copying light according to said patent consist of uncolored fields and fields colored in the primary colors arranged on a single filter in such a manner that incorrect reproduction of color of a color photograph can be compensated by displacing an apertured screen parallel to the filter in a system of coordinates corresponding with the arrangement of the colored and uncolored fields.

If it is desired, however, to compensate for the incorrect reproduction of each color separately and by steps, such a color correction becomes rather difficult with the apparatus described in the aforementioned patent. Such independent correction of colors is useful, if it is found by a test that for example the blue component of the picture is correctly compensated, but not the red component.

It is an object of my present invention to provide a simple apparatus for compensating for incorrect reproduction of color during the copying or enlarging of color photographs.

A further object is to correct the single colors independently from each other.

Another object of the present invention is to provide in the path of the copying light several filters corresponding to the number of the primary colors each of the filters containing alternately colored and uncolored fields being of equal size with one another.

These and other objects will become apparent from the following description.

The various filters can be displaced independently with regard to the rigidly mounted apertured screen. The filters are preferably moved by several adjacent coaxial, but separated shafts, each having on one end a rotatable knob, the other ends being connected with the filters by suitable gears, for example toothed wheels, racks and bell-crank levers. The apertures of the perforated screen are somewhat smaller than the colored or uncolored fields of the filters. The filters and the apertured screen may be arranged on a common frame which can be removed from the apparatus. In order to make possible a quantitative adjustment of the colored and uncolored fields, scales may be preferably provided adjacent to each other and dyed in the primary colors. Over the scales pointers are mounted, the ends of which traverse the scales. These pointers are mounted on the coaxial shafts which move the filters to and fro. The translucent scales may be illuminated from the inside. To employ several filters dyed in the primary colors has the advantage that not only each color and color-mixture of whatever degree may be obtained, but also that after the correct adjustment of one color filter a second color filter may be adjusted independently from the first one. The color correction of another color component already calculated and carried into effect remains unchanged.

Figure 6:
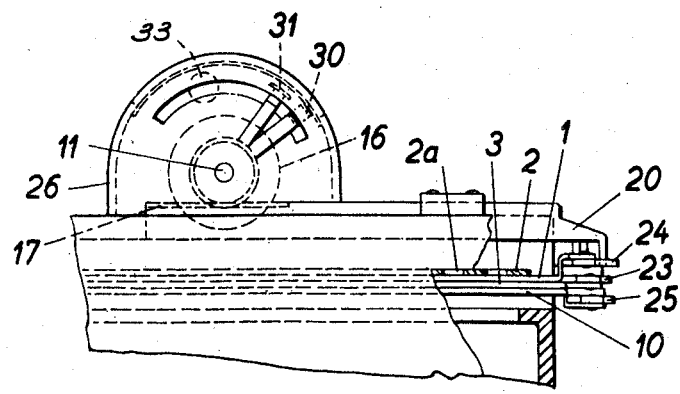

The invention is illustrated by way of example in the accompanying drawings, in which Figure 1 is a partial view of one of the filters, Figure 2 is a partial view of perforated screen for partly covering the filter, Figure 3 is a view of two color filters displaced against one another under the perforated screen, Figure 4 is a section through a copying apparatus in which the filters and perforated screen have been inserted, Figure 5 is a view of apparatus for controlling the color filters, Figure 6 is a partial side view of the control apparatus for the color filters.

The filters 1, 3, 10 are colored for example in the three primary colors green-yellow, purple, and blue-green. There is shown in Figure 1 the filter 1 colored in the primary color blue-green. It consists of strips of equal breadth the strips being alternately of blue-green colored fields 1b and uncolored fields 1gr which preferably consist of grey filters. The blackening of the grey filters preferably is such that the absorption of light thereby is equal to the absorption of light by the colored fields. The other two primary colors, purple and green-yellow, on the two other filters 3 and 10 are arranged in the same manner.

The perforated screen 2 of Figure 2 is built into the copying apparatus and possesses perforations 2a whose form and arrangement correspond to the filters. Since at least two of the filters have a certain distance from the perforated screen, scattered light of the adjacent portions of the filter fields which are not being adjusted directly under the perforations 2a of the perforated screen may penetrate through the screen. In order to prevent this the breadth of the perforations 2a is somewhat smaller than that of the colored and uncolored fields of the filters superimposed on one another.

The filters and the perforated screen 2 are preferably built into a common frame 4b which can be easily removed from the copying apparatus. This is of advantage when alternatively color images and black and white images are printed in the apparatus.

As illustrated in Figure 3 the two filters 1 and 3 may be so displaced independently from each other under the fixed screen 2 in a direction perpendicular to the strips 1b, 3p, that any desired portion of color of the two filters 1 and 3 may be brought into the path of rays of the copying light which penetrate through the perforations 2a of the screen 2. As illustrated in Figure 3 for example the two filters 1 and 3 are so far apart from each other, that a relatively large portion 1b of the blue-green filter and a relatively small portion 3p of the purple filter alter the copying light accordingly. The remaining opening 2a not covered by a colored filter portion is made up in this case by the grey filters 1gr, 3gr, 10gr superimposed on one another. By this arrangement a copying light is obtained, which is chiefly corrected in the bluish-green portion, and to a small extent also in the purple portion.

The arrangement of the screen 2 and the filters 1, 3 and 10 in a common frame 4b of a copying apparatus can be seen from Figure 4 in which 4 denotes the housing of the apparatus, 5 the source of light, 6 a reflector for the source 5, 7 a diffusing screen, 8 the copying material, 9 the pressure plate. The pressure plate is mounted on a shaft 9a which turns in bearings 4a. Between the diffusion screen 7 and the light source 5 are situated the filters 1, 3, 10 and the screen 2 in a common frame 4b.

The apparatus shown in Figures 5 and 6 enables the color necessary for the compensation of a given incorrectness of reproduction to be obtained by controlling the movements of the filters 1, 3, 10 in front of the perforated screen 2. The apparatus comprises three coaxial shafts 11, 12, 13 which have on their ends three rotatable knobs 14, 15, 16. The other ends are connected with the corresponding toothed wheels 17, 18, 19, the rotation being transmitted to the filters 1, 3, 10 by racks 20, 21, 22 and bell-crank levers 23, 24, 25.

Round the shafts 11, 12, 13 is a housing 26 on which there are three neighboring translucent scales 27, 28, 29 colored in the same primary colors as the filters 1, 3, 10. A small light source 33 may be provided there for the illumination of these scales. Pointers 30, 31, 32 traverse over the scales 27, 28, 29. The pointer arms 30, 31, 32 are mounted on the shafts 11, 12, 13 belonging to the different filters 1, 3, 10. The arrangement of the pointers 30, 31, 32 with regard to the position of the filters 1, 3, 10 is such, that at the lowest, i. e., at zero-position of the pointers only the uncolored portions of the filters are within the path of the copying light rays.

The apparatus works in the following manner: If, for example, a test has shown that the copying light needs a color correction in the blue-green portion, it is in this case only necessary to turn knob 15 for the appropriate amount, knob 15 being connected with the blue-green filter 1. If after this correction it is found out that the green component is properly adjusted, but not yet the yellow component, the corresponding yellow filter 10 may be inserted into the path of the light by turning knob 16 without affecting the correction of the green component which was correctly adjusted before. In exactly the same manner the other color components may be compensated.

What I claim is:

1. Apparatus for compensating, during the copying and enlarging of a color photograph, for incorrect color reproduction in said photograph, including: a copying light; a fixed screen in the path of said light having alternate opaque and transparent fields; and a plurality of parallel, superimposed filters each colored in a primary color and each having alternate colored and uncolored fields, said filters being in the path of said light adjacent said fixed screen and being movable parallel to said screen and independently of each other and of said screen for varying the position of the filter fields over the transparent screen fields and thus adjusting the color composition of the light transmitted through the filters and screen.

2. Apparatus for compensating, during the copying and enlarging of a color photograph, for incorrect color reproduction in said photograph, including: a copying light; a fixed screen in the path of said light having alternate opaque and transparent fields; and a plurality of parallel, superimposed filters each colored in a primary color and each having colored and uncolored fields of equal size arranged in alternate rows, said filters being in the path of said light adjacent said fixed screen and being movable parallel to said screen and independently of each other and of said screen for varying the position of the filter fields over the transparent screen fields and thus adjusting the color composition of the printing light transmitted through the filters and screen.

3. Apparatus for compensating, during the copying and enlarging of a color photograph, for incorrect color reproduction in said photograph, including: a copying light; a fixed screen in the path of said light, having alternate opaque and transparent fields; and a plurality of parallel, superimposed filters each colored in a primary color and each having alternate colored and gray fields, the blackening of said gray fields being such that the absorption of light thereby is equal to the absorption of light by said colored fields, said filters being in the path of said light adjacent said fixed screen and being movable parallel to said screen and independently of each other and of said screen for varying the position of the filter fields over the transparent screen fields and thus adjusting the color composition of the light transmitted through the filters and screen.

4. Apparatus for compensating, during the copying and enlarging of a color photograph, for incorrect color reproduction in said photograph, including: a copying light; a fixed screen in the path of said light, having alternate opaque and transparent fields; and a plurality of parallel, superimposed filters each colored in a primary color and each having alternate colored and gray fields, the density of the gray fields being equal to the gray density of the colored fields, said filters being in the path of said light adjacent said fixed screen and being movable parallel to said screen and independently of each other and of said screen for varying the position of the filter fields over the transparent screen fields and thus adjusting the color composition of the light transmitted through the filters and screen.

5. Apparatus for compensating, during the copying and enlarging of a color photograph, for incorrect color reproduction in said photograph, including: a copying light; a fixed screen in the path of said light having alternate opaque and transparent fields; a plurality of parallel, superimposed filters each colored in a primary color and each having alternate colored and uncolored fields, said filters being in the path of said light adjacent said fixed screen and being movable parallel to said screen and independently of each other and of said screen for varying the position of the filter fields over the transparent screen fields and thus adjusting the color composition of the light transmitted through the filters and screen; and means for moving said filters including coaxial shafts, one for each filter, adjacent coaxial knobs at one end of said shafts, the other end of each shaft being operatively connected to its filter through a toothed wheel, rack and bell-crank lever.

6. Apparatus for compensating, during the copying and enlarging of a color photograph, for incorrect color reproduction in said photograph, including: a copying light; a fixed screen in the path of said light having alternate opaque and transparent fields; and a plurality of parallel, superimposed filters each colored in a primary color and each having alternate colored and uncolored fields, said filters being in the path of said light adjacent said fixed screen and being movable parallel to said screen and independently of each other and of said screen for varying the position of the filter fields over the transparent screen fields and thus adjusting the color composition of the light transmitted through the filters and screen, said transparent screen fields being somewhat smaller than the colored and uncolored filter fields.

7. Apparatus for compensating, during the copying and enlarging of a color photograph, for incorrect color reproduction in said photograph, including: a copying light; a fixed screen in the path of said light having alternate opaque and transparent fields; a plurality of parallel, superimposed filters each colored in a primary color and each having alternate colored and uncolored fields, said filters being in the path of said light adjacent said fixed screen and being movable parallel to said screen and independently of each other and of said screen for varying the position of the filter fields over the transparent screen fields and thus adjusting the color composition of the light transmitted through the filters and screen; and a common frame which can be removed from the apparatus and on which the screen and filters are mounted.

8. Apparatus for compensating, during the copying and enlarging of a color photograph, for incorrect color reproduction in said photograph, including: a copying light; a fixed perforated screen and a plurality of movable filters in the path of said light, each filter being colored in a primary color; means for moving said filters parallel to the screen and independently of each other and of the screen for adjusting the color composition of said copying light; a translucent scale for each filter, colored in a primary color corresponding to its filter; and a pointer cooperating with each scale and connected to the corresponding filter moving means for indicating the color composition of the copying light transmitted by said filters and screen.

9. Apparatus for compensating, during the copying and enlarging of a color photograph, for incorrect color reproduction in said photograph, including: a copying light; a fixed perforated screen and a plurality of movable filters in the path of said light, each filter being colored in a primary color; means for moving said filters parallel to the screen and independently of each other and of the screen for adjusting the color composition of said copying light, said means including rotatable coaxial shafts, one for each filter, each shaft being connected to its filter through a toothed wheel, rack and bell-crank lever; a translucent scale for each filter, colored in a primary color corresponding to its filter; and a pointer cooperating with each scale and connected to the corresponding coaxial shaft for indicating the color composition of the copying light transmitted by said filters and screen.

10. Apparatus for compensating, during the copying and enlarging of a color photograph, for incorrect color reproduction in said photograph, including: a copying light; a fixed perforated screen and a plurality of movable filters in the path of said light, each filter being colored in a primary color; means for moving said filters parallel to the screen and independently of each other and of the screen for adjusting the color composition of said copying light; a translucent scale for each filter, colored in a primary color corresponding to its filter and illuminated from the inside; and a pointer cooperating with each scale and connected to the corresponding filter moving means for indicating the color composition of the copying light transmitted by said filters and screen.

FERDINAND BUSSE.